United States Patent

Danieau

[11] Patent Number: 5,916,021
[45] Date of Patent: Jun. 29, 1999

[54] APPARATUS FOR CONTROLLING THE FLOW OF A STREAM OF AIR FOR A MOTOR VEHICLE

[75] Inventor: Jacques Danieau, Noisy le Roi, France

[73] Assignee: Valeo Climatisation, La Verriere, France

[21] Appl. No.: 08/828,165

[22] Filed: Mar. 27, 1997

[30] Foreign Application Priority Data

Mar. 29, 1996 [FR] France .................................. 96.04005

[51] Int. Cl.$^6$ .................................................. B60H 1/24
[52] U.S. Cl. ............................ 454/69; 251/901; 454/156
[58] Field of Search ............................. 454/69, 121, 126, 454/156, 159, 160, 161; 251/129.11, 326, 901

[56] References Cited

U.S. PATENT DOCUMENTS 5,105,730  4/1992  Smith ....................................... 454/161
5,653,630  8/1997  Higashihara ............................ 454/121

FOREIGN PATENT DOCUMENTS

| 459 473 | 12/1991 | European Pat. Off. . |
| 2580791 | 10/1986 | France . |
| 211981 | 5/1968 | U.S.S.R. ............................ 251/901 X |
| 93/19946 | 10/1993 | WIPO . |

*Primary Examiner*—Harold Joyce
*Attorney, Agent, or Firm*—Morgan & Finnegan, LLP

[57] ABSTRACT

An apparatus for controlling the flow of a stream of air consists of an independent module that comprises a support structure on which two rollers are mounted for rotation. A film, having open regions and closed regions, is wound between the two rollers, so that when the rollers are rotated to displace the film between the rollers, the relative positions of the open and closed regions of the film gives selective control of the flow of an air stream directed on to the film. Thus, when the apparatus is placed across an air flow aperture, this air passes through a window formed in the support structure and overlying the film.

7 Claims, 2 Drawing Sheets

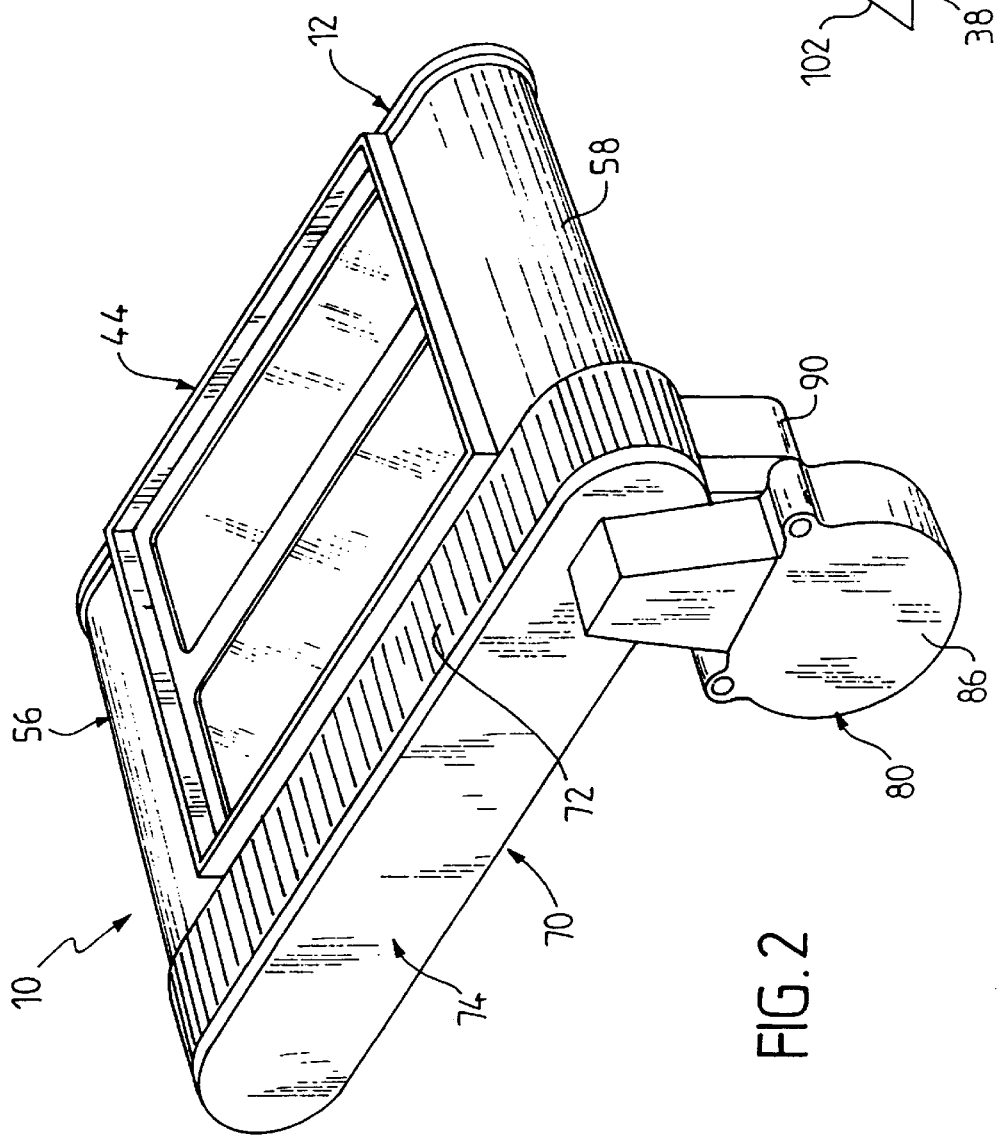
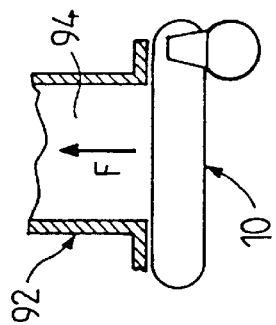
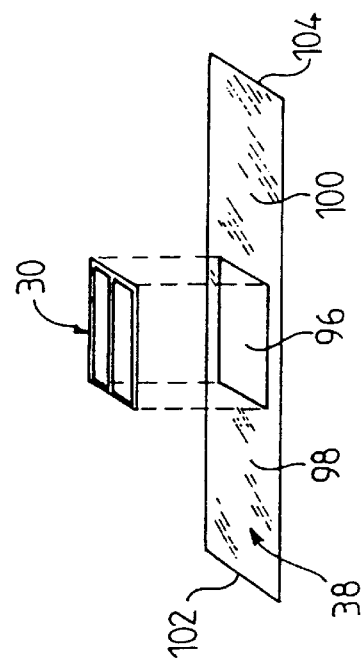

APPARATUS FOR CONTROLLING THE FLOW OF A STREAM OF AIR FOR A MOTOR VEHICLE

FIELD OF THE INVENTION

This invention relates to an apparatus, or air flow control device, for controlling the flow of a stream of air through an air passage aperture and the like, in particular for an installation for heating and/or air conditioning a motor vehicle.

BACKGROUND OF THE INVENTION

In installations of this kind it is necessary to provide at least one air flow control apparatus, or device, for controlling the flow rate of a stream of air passing through an aperture. The stream of air may, as the case may be, be either cold air, heated air, or conditioned air. This air passage aperture may be defined, in particular, by a duct, a distribution port, or other element of the system. It is usual to provide air flow control devices in the form of pivoting flap valves, which are typically of the curtain or butterfly type. Such flap valves can be actuated, in rotation, either manually or by means of a motorized drive. Such installations having flap valves have the major disadvantage that a relatively large amount of space has to be provided for displacement of the valve member (or flap), and this contributes to the space requirement of the heating and/or air conditioning installation within the vehicle. In addition, these types of pivoting valve have considerable resistance to the air flow, so that quite powerful motorized drives are needed for their operation.

It is also known, in particular from French patent specification No. FR 2 580 791A, to employ a control apparatus or device of the type comprising a film (also referred to as a blind or curtain), which is wound on two rollers spaced apart from each other. The film is arranged so that the portion of the film exposed between the two rollers is disposed across the air passage aperture through which the flow of air is to be controlled. The film is formed with suitable apertures, so that it has open regions through which air can pass, and solid or closed regions through which air cannot pass, so that displacement of the film by operation of the rollers, so as to change the relationship between the open and closed regions of the film and the associated air passage aperture gives selective control of the flow rate of the air through that aperture. The film can thus be displaced in either one direction or the other, by winding it further on to one of the rollers and unwinding it at the same time from the other, thereby offering various options in the regulation of the air flow.

A device of the above kind may be referred to as a "film obturator". It has the drawback that its structure is somewhat complex. Moreover, the casing of the heating or air conditioning installation has to be specially adapted to enable the film obturator to be fitted within the casing. This in turn means that the casing of the installation then has a complex structure itself. In addition, it should be noted that known types of film obturator have to be specially designed to suit each particular type of casing of the installation. And quite apart from the above, fitting of the known film obturators involves lengthy and expensive assembly operations.

DISCUSSION OF THE INVENTION

A main object of the invention is to overcome the above mentioned drawbacks in film obturators.

According to the invention, an apparatus is provided in the form of an air flow control device, for controlling the flow of a stream of air through an air passage aperture, in particular for a heating and/or air conditioning installation for a motor vehicle. The apparatus is of the type comprising a film wound on two rollers spaced apart from each other. The film is adapted to extend across the said air passage aperture, the film having open regions and closed regions for selectively controlling the flow of the said air stream according to the position of the film. The apparatus is characterised in the form of an independent module comprising a support structure on which the two rollers are mounted for rotation about parallel axes. The support structure defines a window in a location intermediate between the two rollers, the film being guided against the said window.

In this way, the apparatus of the invention is made in the form of a single module or cassette, which can readily be fitted into a heating and/or air conditioning installation for a motor vehicle. The casing of the installation simply needs to include a suitable preformed housing, which is arranged to receive the module in a position such that the window of the module lies across the air passage aperture through which the flow rate of the air is to be controlled. The module is thus able to be fitted without any particular tooling being necessary, and moreover, the same design of module can be arranged to equip the casings of different installations, and this enables the modules to be standardized.

The module in accordance with the invention thus represents a component which is completely independent of the remainder of the installation. This enables it to exercise by itself the control function for the air stream by opening or closing the associated air passage aperture under controlled conditions.

Preferably, the support structure comprises two opposed side plates carrying the rollers for rotation about parallel axes, together with two cross members joining the two side plates together in such a way that the window is defined between the two side plates and the two cross members.

The apparatus preferably further includes a press-frame which is arranged to be fixed to the support structure in facing relationship with the window for guiding and retaining the film against the window.

According to a preferred feature of the invention, the apparatus further includes two backing plates, preferably of curved form, which are adapted to be applied to the support structure and to engage the film against the respective rollers, in such a way as to enable the film to be wound and unwound on the rollers without deformation of the film.

According to another preferred feature of the invention, the apparatus further includes a drive mechanism adapted to drive the two rollers in synchronous reversible rotary motion. This reversible synchronizing drive mechanism may for example include a synchronizing shaft including gear elements which are adapted to cooperate with respective further gear elements, each of which is carried at the end of a respective one of the two rollers.

The drive mechanism is preferably contained in a casing disposed along the support structure. Preferably, the casing comprises a base through which the axes of the rollers pass, together with a side wall joined to the base, and a protective cover which is fixed on the side wall, for example by clipping.

In preferred embodiments of the invention, the apparatus further includes a motorized drive unit fixed to the support structure and including a drive shaft which is adapted to be coupled to one of the rollers. In this connection, the drive unit may conveniently be fixed to fastening elements of the support structure; and the drive shaft of the drive unit is preferably a splined shaft adapted to be introduced axially into a matching splined bore formed at one of the ends of one of the rollers.

Further features and advantages of the invention will appear more clearly on a reading of the following detailed description of a preferred embodiment of the invention, which is given by way of non-limiting example only and with reference to the accompanying drawings.

BRIEF DESCRIPTION OF THE DRAWINGS

FIG. 2 is a perspective view of the flow control device of FIG. 1, shown assembled.

FIG. 3 is a diagrammatic view showing, in cross section, an air passage equipped with a flow control device according to the invention.

FIG. 4 is a perspective view showing diagrammatically a window of the flow control device in facing relationship with the corresponding film.

DESCRIPTION OF A PREFERRED EMBODIMENT OF THE INVENTION

Figure 1:
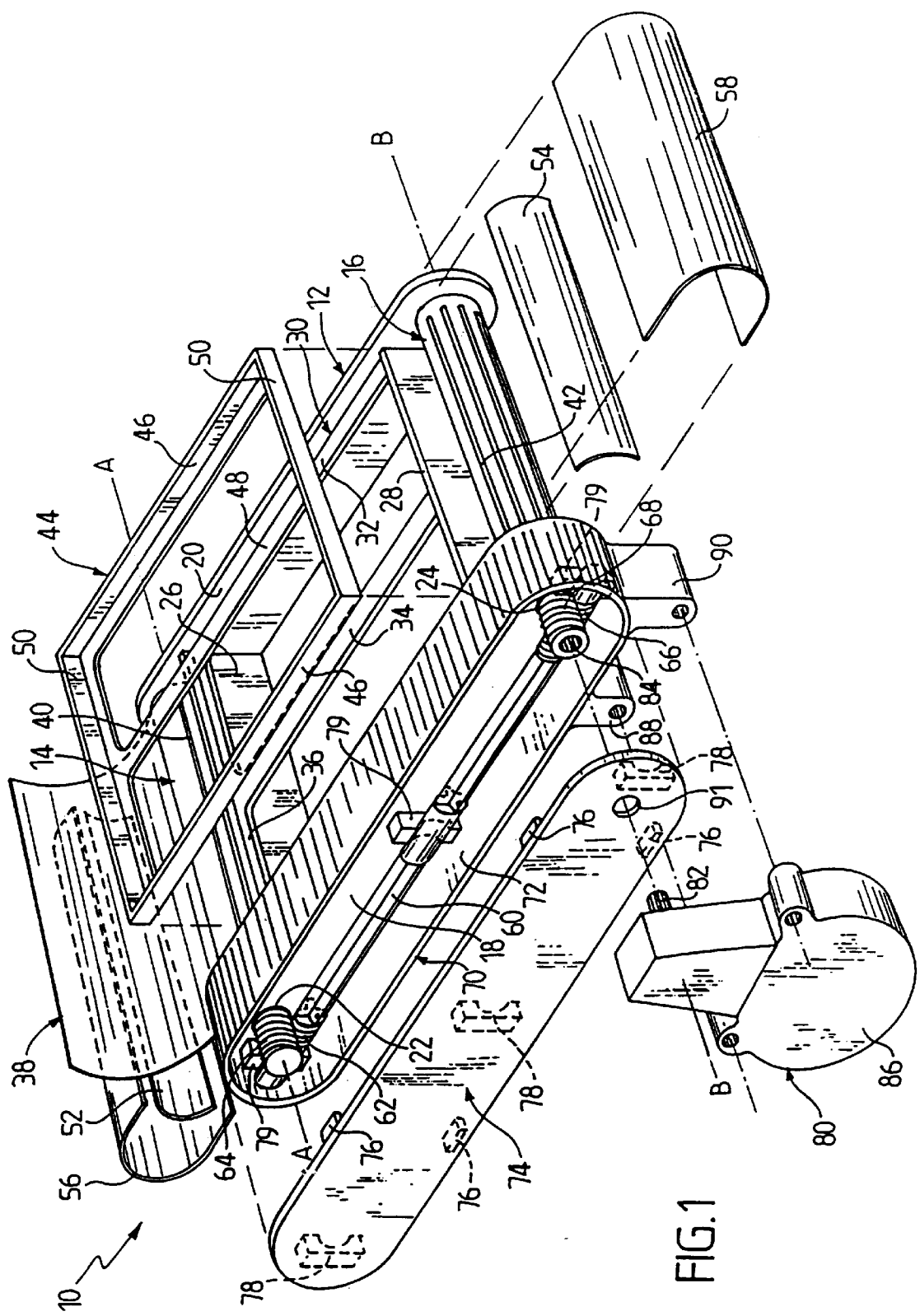
FIG. 1 is an exploded perspective view of an apparatus consisting of an air flow control device in accordance with the invention.

The air flow control device or apparatus shown in FIG. 1 is made in the form of an independent module 10 constituting a cassette. The module 10 includes a support structure (or support frame, or chassis) 12 on which two rollers 14 and 16 are mounted. The first roller 14 is mounted for rotation about an axis A—A, while the other roller 16 is mounted for rotation about an axis B—B parallel to the axis A—A. The supporting chassis 12, which is preferably made of a suitable plastics material, comprises two opposed side plates 18 and 20, of elongate configuration. The side plates 18 and 20 are parallel to each other, and the axes of the rollers 14 and 16 extend through the side plates 18 and 20, in the region of the opposed ends of the latter, respectively. In particular, the respective axes of the rollers 14 and 16 pass through holes 22 and 24 in the side plate 18.

The two side plates 18 and 20 are joined together by means of two cross members 26 and 28 of the chassis, which are arranged parallel to each other and close to the rollers 14 and 16 respectively. The cross members 26 and 28 define, with the side plates 18 and 20, a generally rectangular opening, in which a window 30 is formed. The window 30 is bounded by two longitudinal elements, or longerons, 32 and two transverse elements or cross bars 36, and is divided by a central longeron 34. The longerons 32 extend respectively along the two side plates 18 and 20, only one of the elements 32 being visible in FIG. 1. Similarly, the two cross bars 36, only one of which can be seen in FIG. 1, extend along the two cross members 26 and 28 respectively.

The apparatus also includes a film 38 which is made in the form of a rectangular flexible band which constitutes a blind or curtain, and which includes open and closed regions as will be seen later herein. The film 38 has a width which corresponds to the space which is defined between the two side members 18 and 20, and is adapted to be engaged, at its ends, in appropriate longitudinal slots 40 and 42 which are formed in the rollers 14 and 16. The film 38 is thus able to be displaced along the window 30 in either direction, while being wound on to one of the rollers 14 or 16 and being unwound from the other, and vice versa.

In addition, the apparatus includes a press-frame 44 which is arranged to be fixed to the supporting chassis 12 in facing relationship with the window 30. The press-frame 44 comprises two outer longitudinal elements 46, or longerons, a central longitudinal member or longeron 48, and two transverse elements or cross bars 50 at its ends. Accordingly, the configuration of the press-frame 44 corresponds to that of the window 30. The purpose of the press-frame is to apply and hold the film 38 in engagement against the window 30, and to prevent it from being deflected under the effect of a stream of air directed through the window 30 and on to the film 38. The central longitudinal members 34 and 48 of the window 30 and press-frame 44 respectively constitute a central bridge which contributes to improved strength of the film 38 in the central part of the window 30.

The apparatus also includes two backing plates 52 and 54 of curved form. These backing plates are arranged to be attached to the supporting chassis 12 so as to hold the film 38 against the rollers 14 and 16 respectively, thus enabling the film to be rolled and unrolled without being deformed. The two backing plates 52 and 54 are held in position by means of respective cover plates 56 and 58 of U-shaped cross section. These cover plates enclose the two ends of the supporting chassis 12.

The two rollers 14 and 16 are driven, in rotation about their respective axes A—A and B—B and in synchronism with each other, by means of a synchronising drive mechanism which drives each roller in reversible motion, i.e. in one sense of rotation or in the opposite sense, as required. This drive mechanism includes a synchronizing shaft 60 of cruciform cross section. The synchronizing shaft 60 carries at one of its ends a gear element 62 which meshes with a second gear element 64 fixed coaxially to the roller 14. At its other end the shaft 60 carries a further gear element 66 which meshes with yet another gear element 68, the element 68 being fixed coaxially, on the axis B—B, to the roller 16. This synchronizing drive mechanism is contained in a casing 70 which extends along the supporting chassis 12. The casing 70 has a base, which in this example consists of the chassis side plate 18, the roller axes A—A and B—B extending through the latter as mentioned above; together with a side wall 72 which is joined to the base 18 of the casing at right angles, and which is matched to the profile of the base 18. The casing 70 also includes a protective cover 74 which is secured to the side wall 72 by means of clipping lugs 76. The cover plate 74 carries three half bearings 78 on its internal face. The purpose of these half bearings is to support and guide the synchronizing shaft 60. These three half bearings, which may also be referred to as "counter bearings", are arranged to cooperate with further half bearings 79 carried by the chassis side plate 18 so as to receive the corresponding cylindrical surface portions of the synchronizing shaft 60.

The apparatus further includes a drive unit 80, consisting of a motor-driven reduction gear unit. The drive unit 80 is arranged to be fixed with respect to the supporting chassis 12, and includes a splined drive shaft 82 which is introduced axially into a matching splined bore 84 formed in the adjacent end of the roller 16, on the axis B—B. The drive unit 80 has a casing 86 which is arranged to be secured to two projecting fastening ears 88 and 90 respectively, by means of screws or other similar fasteners (not shown). In this example, the two fastening ears 88 and 90 are formed on the outside of the side wall 72 of the casing 70. The drive unit 80 partly covers the protective cover 74, which is formed with a hole 91 (FIG. 1) through which the splined drive shaft 82 passes.

The various components of the apparatus are assembled together so as to form the assembled module 10 shown in FIG. 2. This module constitutes an independent unit which can readily be fitted within the casing of an installation, in a motor vehicle, for heating and/or air conditioning.

Reference is now made to FIG. 3, which shows an air passage 92, which in this example is a duct and which defines a transverse aperture 94. The module 10 of FIG. 2 is fitted across this aperture 94. The module 10 is disposed in such a way that its window 30 lies in facing relationship with the aperture in the air duct 92, the latter being generally rectangular.

The apparatus in FIGS. 1 and 2 is primarily intended to control the flow of a stream of air through a single air passage aperture which offers a rectangular cross section, the dimensions of which are similar to those of the window 30. The central longerons 34 of the window 30, and the corresponding central longeron 48 of the press-frame 44, can be arranged to improve the retention of the film 38, even if only one air passage aperture is to be controlled.

Reference is now made to FIG. 4, which shows the film 38 in its unwound state, in facing relationship with the corresponding window 30. In this example, the film 38 has a rectangular open region 96 which is flanked by two solid, or closed, regions 98 and 100 of the film 38. Thus, the window 30, and consequently the aperture 94 in the air duct 92 (FIG. 3), may be completely open, or completely closed, or partially open, according to the position adopted by the film 38 relative to the window 30 and therefore the aperture 94.

The invention is of course not limited to the embodiment described above by way of example. It is possible to envisage other versions, as regards the structure of the support frame or chassis, and as regards the means for moving the film.

Again, the apparatus may be used for controlling the flow of one or more streams of air through one or more air passage apertures, by providing open and closed, or solid, regions in suitable locations on the film. In that case, the window can be divided into several apertures of selected forms, which are then arranged to be put into facing relationship with the apertures of the air passages to be controlled.

The apparatus of the invention is most particularly suitable for equipping passenger vehicles, such as motor cars, whether or not the vehicle has the option of air conditioning.

What is claimed is:

1. Apparatus for controlling the flow of a stream of air through an air passage aperture, the apparatus having two rollers spaced apart from each other and a film wound on the rollers, to define an exposed portion of the film between the rollers so that the film can be disposed with the exposed portion lying across the air passage aperture, the rollers being rotatable together whereby to displace the exposed portion of the film across the aperture, the film defining open and closed regions thereof for selectively controlling the air flow according to the position of the film relative to the aperture, wherein the apparatus is an independent module comprising a support structure defining two axes parallel to each other, each of the rollers being mounted for rotation on a respective one of the axes, the support structure defining a window intermediate between the rollers and adjacent the exposed portion of the film, whereby the film is guided against the window further including two backing plates, each of which is applied to the support structure to urge the film against a respective one of the rollers to prevent deformation of the film being wound on the rollers.

2. Apparatus according to claim 1, wherein the support structure comprises two opposed side plates and two cross members joining the side plates together, to constitute a frame defining the window within the frame, the side plates defining the axes and carrying the rollers for rotation about the axes.

3. Apparatus according to claim 1, further including a press-frame fixed to the support structure in facing relationship with the window, for guiding and holding the film against the window.

4. Apparatus for controlling the flow of a stream of air through an air passage aperture, the apparatus having two rollers spaced apart from each other and a film wound on the rollers, to define an exposed portion of the film between the rollers so that the film can be disposed with the exposed portion lying across the air passage aperture, the rollers being rotatable together whereby to displace the exposed portion of the film across the aperture, the film defining open and closed regions thereof for selectively controlling the air flow according to the position of the film relative to the aperture, wherein the apparatus is an independent module comprising a support structure defining two axes parallel to each other, each of the rollers being mounted for rotation on a respective one of the axes, the support structure defining a window intermediate between the rollers and adjacent the exposed portion of the film, whereby the film is guided against the window, further including drive means constituting part of the module and coupled with the rollers, for driving the rollers in synchronized reversible rotary motion in either direction of rotation, wherein the drive means include a drive mechanism which has a synchronizing shaft having first gear elements, each of the rollers having an end carrying a respective second gear element, each of the second gear elements meshing with a respective one of the first gear elements.

5. Apparatus according to claim 1, further including a casing extending along the support structure, the drive mechanism being contained in the casing.

6. Apparatus according to claim 5, wherein the casing comprises a base, a side wall joined to the base, and a protective cover secured on the side wall, the base being intersected by the axes of the rollers.

7. Apparatus for controlling the flow of a stream of air through an air passage aperture, the apparatus having two rollers spaced apart from each other and a film wound on the rollers, to define an exposed portion of the film between the rollers so that the film can be disposed with the exposed portion lying across the air passage aperture, the rollers being rotatable together whereby to displace the exposed portion of the film across the aperture, the film defining open and closed regions thereof for selectively controlling the air flow according to the position of the film relative to the aperture, wherein the apparatus is an independent module comprising a support structure defining two axes parallel to each other, each of the rollers being mounted for rotation on a respective one of the axes, the support structure defining a window intermediate between the rollers and adjacent the exposed portion of the film, whereby the film is guided against the window, drive means for driving the rollers, a motorized drive unit fixed with respect to the support structure and a drive shaft coupled to one of the rollers, wherein the support structure carries fastening elements, one of the rollers having a splined bore formed in one of its ends, the motorized drive unit being secured to the fastening elements and having a splined drive shaft engaged axially in the splined bore.

* * * * *